(12) United States Patent
Hokazono

(10) Patent No.: US 11,701,927 B2
(45) Date of Patent: Jul. 18, 2023

(54) PNEUMATIC TIRE

(71) Applicant: Sumitomo Rubber Industries, Ltd., Hyogo (JP)

(72) Inventor: Hiroki Hokazono, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 17/321,254

(22) Filed: May 14, 2021

(65) Prior Publication Data

US 2021/0379937 A1 Dec. 9, 2021

(30) Foreign Application Priority Data

Jun. 9, 2020 (JP) ................................. 2020-100339

(51) Int. Cl.
*B60C 13/02* (2006.01)

(52) U.S. Cl.
CPC .................................... *B60C 13/02* (2013.01)

(58) Field of Classification Search
None
See application file for complete search history.

(56) References Cited

U.S. PATENT DOCUMENTS

| | | | |
|---|---|---|---|
| 2005/0173040 A1* | 8/2005 | Nobuyoshi | B29C 48/12 264/177.17 |
| 2009/0032161 A1* | 2/2009 | Yamaguchi | B60C 13/02 152/523 |
| 2014/0224397 A1* | 8/2014 | Okabe | B60C 11/125 152/209.23 |
| 2015/0191052 A1* | 7/2015 | Okabe | B60C 11/1369 152/209.18 |
| 2016/0159163 A1* | 6/2016 | Kishida | B60C 11/0327 152/209.19 |
| 2018/0086154 A1* | 3/2018 | Takita | B60C 13/02 |
| 2019/0054776 A1* | 2/2019 | Matsubara | B60C 11/01 |
| 2019/0152265 A1* | 5/2019 | Yokomakura | B60C 11/1353 |

FOREIGN PATENT DOCUMENTS

JP 2020-045099 A 3/2020

* cited by examiner

*Primary Examiner* — Katelyn W Smith
*Assistant Examiner* — Alexander D Booth
(74) *Attorney, Agent, or Firm* — Studebaker & Brackett PC

(57) ABSTRACT

A pneumatic tire has a pair of sidewall portions. An outer surface in a tire axial direction of at least one of the sidewall portions includes a base surface, at least one first protruding portion protruding more outward in the tire axial direction than the base surface, and a recessed portion extending on the base surface around the first protruding portion such that the first protruding portion is spaced apart from the base surface. The first protruding portion includes a first surface having a first protruding amount with respect to the base surface, and a second surface having a second protruding amount different from the first protruding amount with respect to the base surface, and the first surface and the second surface are connected so as to form a step.

19 Claims, 11 Drawing Sheets

PNEUMATIC TIRE

TECHNICAL FIELD

The present invention relates to a pneumatic tire.

BACKGROUND ART

For example, the following Patent Document 1 has proposed a tire that, by specifying pattern elements of a tread portion, can achieve a higher level of performance on an icy road surface and performance on a dry road surface, especially in anti-wear performance.

PRIOR ART DOCUMENT

Patent Document

Patent Document 1
Japanese Unexamined Patent Application Publication No. 2020-045099

SUMMARY OF THE INVENTION

Problems to be Solved by the Invention

By the way, in recent years, for pneumatic tires designed to run on uneven terrain, improvement in running performance on various road surfaces has been required, especially improvement in traction performance on a soft road such as a snowy road and a sandy place has been required.

The inventors have focused on providing protruding portions on sidewall portions, and have completed the present invention by improving the shape of the protruding portions.

The present invention has been made in view of the above, and a primary object thereof is to provide a pneumatic tire having improved traction performance on a soft road.

Means for Solving the Problems

The present invention is a pneumatic tire including a pair of sidewall portions wherein an outer surface in a tire axial direction of at least one of the sidewall portions includes a base surface, at least one first protruding portion protruding more outward in the tire axial direction than the base surface, and a recessed portion extending on the base surface around the first protruding portion such that the first protruding portion is spaced apart from the base surface, the first protruding portion includes a first surface having a first protruding amount with respect to the base surface, and a second surface having a second protruding amount different from the first protruding amount with respect to the base surface, and the first surface and the second surface are connected so as to form a step.

In the pneumatic tire according to the present invention, it is preferred that, in the first protruding portion, the first surface and the second surface are arranged in a tire radial direction.

In the pneumatic tire according to the present invention, it is preferred that the second protruding amount is smaller than the first protruding amount, and the second surface is located radially outside the first surface.

In the pneumatic tire according to the present invention, it is preferred that a cross-sectional area of the first protruding portion taken along the base surface is increased as it goes towards a bottom portion of the recessed portion.

In the pneumatic tire according to the present invention, it is preferred that the at least one first protruding portion is a plurality of the first protruding portions, the at least one of the sidewall portions is provided with a plurality of the first protruding portions, and a second protruding portion, which protrudes more outward in the tire axial direction than the base surface, is arranged between the first protruding portions adjacent to each other.

In the pneumatic tire according to the present invention, it is preferred that the second protruding portion protrudes outward in the tire axial direction directly from the base surface.

In the pneumatic tire according to the present invention, it is preferred that the second protruding portion has a protruding amount from the base surface decreasing as it goes inward in the tire radial direction.

In the pneumatic tire according to the present invention, it is preferred that a maximum protruding amount of the second protruding portion from the base surface is smaller than a maximum protruding amount of each of the first protruding portions from the base surface.

In the pneumatic tire according to the present invention, it is preferred that a maximum length in the tire radial direction of the second protruding portion is smaller than a maximum length in the tire radial direction of each of the first protruding portions.

In the pneumatic tire according to the present invention, it is preferred that a maximum length in a tire circumferential direction of the second protruding portion is smaller than a maximum length in the tire circumferential direction of each of the first protruding portions.

In the pneumatic tire according to the present invention, it is preferred that the second protruding portion includes a top surface facing outward in the tire axial direction, and the top surface is provided with a concave groove.

In the pneumatic tire according to the present invention, it is preferred that the concave groove extends on the top surface of the second protruding portion in the tire radial direction.

In the pneumatic tire according to the present invention, it is preferred that a bottom surface of the recessed portion is provided with a groove portion extending along an opening shape of the recessed portion.

In the pneumatic tire according to the present invention, it is preferred that the at least one of the sidewall portions is provided with a circumferential groove arranged radially outside the first protruding portion and extending in a tire circumferential direction.

In the pneumatic tire according to the present invention, it is preferred that the circumferential groove includes an edge connected to the base surface, and a bottom, which is a deepest point from the base surface, in a lateral cross section of the circumferential groove, an angle with respect to the tire axial direction of a normal line passing through the bottom is smaller than an angle with respect to the tire axial direction of a normal line passing through the edge.

Effects of the Invention

By employing the above-described configuration, the pneumatic tire of the present invention can improve traction on a soft road.

MODE FOR CARRYING OUT THE INVENTION

An embodiment of the present invention will now be described in conjunction with accompanying drawings.

Figure 1:
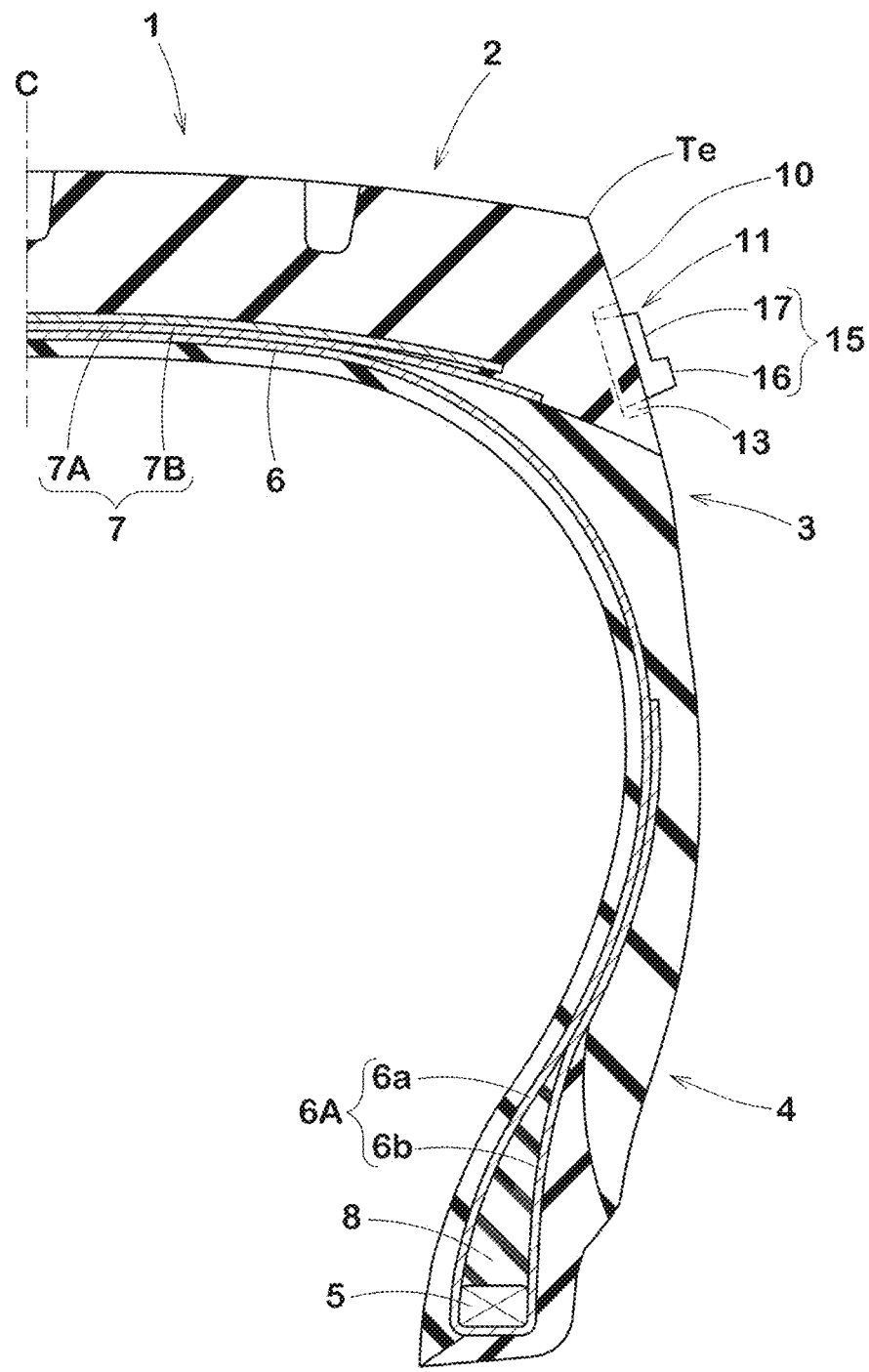
FIG. 1 a lateral cross-sectional view of a tire according to an embodiment of the present invention.

FIG. 1 is a lateral cross-sectional view passing through a tire rotational axis of a pneumatic tire 1 (hereinafter, may be referred to simply as "tire") according to the present embodiment in a standard state. It should be noted that FIG. 1 is a diagram showing a half tire cross section on one side in a tire axial direction from a tire equator (C) when the tire 1 extending in an annular shape is cut in a virtual plane orthogonal to a tire circumferential direction. The tire 1 of the present embodiment is suitably used for an RV or an SUV designed for off-road driving, for example.

The standard state is a state in which, in the case of a pneumatic tire for which various standards are defined, the tire is mounted on a standard rim, inflated to a standard inner pressure, and loaded with no tire load. In the case of a tire for which various standards are not defined, said standard state means a state of the tire in a typical and normal usage condition for the intended use of the tire. In the present specification, unless otherwise noted herein, the dimensions and the like of various parts of the tire are values measured in the standard state. It should be noted that each configuration described herein shall allow for the usual errors contained in rubber molded products.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

As shown in FIG. 1, the tire 1 of the present embodiment includes a tread portion 2, a pair of sidewall portions 3, a pair of bead portions 4, and a carcass 6. A bead core 5 is embedded in each of the bead portions 4. The carcass 6 extends between the pair of bead portions 4 in a toroidal manner. It should be noted that in FIG. 1, one half of the tread portion 2, one half of the pair of sidewall portions 3, and one half of the pair of bead portions 4 are omitted.

The carcass 6 includes a carcass ply 6A having carcass cords extending from the bead portion 4 on one side to the bead portion 4 on the other side (not shown) via the tread portion 2. It goes without saying that the carcass cords pass through the sidewall portions 3.

The carcass ply 6A of the present embodiment is configured in which the carcass cords are arranged parallel and covered with a topping rubber, for example. The carcass 6 of the present embodiment is composed of a single carcass ply 6A, but may be composed of a plurality of the carcass ply 6A.

The carcass ply 6A includes a main body portion (6a) and turned up portions (6b), for example. The main body portion (6a) extends between the two bead portions 4, for example. Thereby, the main body portion (6a) extends at least between the bead cores 5 of the bead portions 4 via the tread portion 2 and the sidewall portions 3. In each of the bead portions 4, the turned up portion (6b) is connected with the main body portion (6a) and turned up around the bead core 5 from inside to outside in the tire axial direction, for example. Between the main body portion (6a) and the turned up portion (6b), a bead apex 8 extending outward in a tire radial direction from the bead core 5 is arranged, thereby each of the bead portions 4 is appropriately reinforced.

Organic fiber cords such as aramid and rayon are employed in carcass cords, for example. It is preferred that the carcass cords are arranged at an angle of 70 degrees or more and 90 degrees or less with respect to the tire equator (C).

As a preferred embodiment, a belt layer 7 is provided radially outside the carcass 6 of the present embodiment. The belt layer 7 is composed of two belt plies 7A and 7B overlaid in a tire radial direction, for example. Each of the belt plies 7A and 7B is formed by belt cords covered with a topping rubber and the belt plies are overlaid in the tire radial direction such that the belt cords of one belt ply intersect with the belt cords of the other belt ply.

Figure 2:
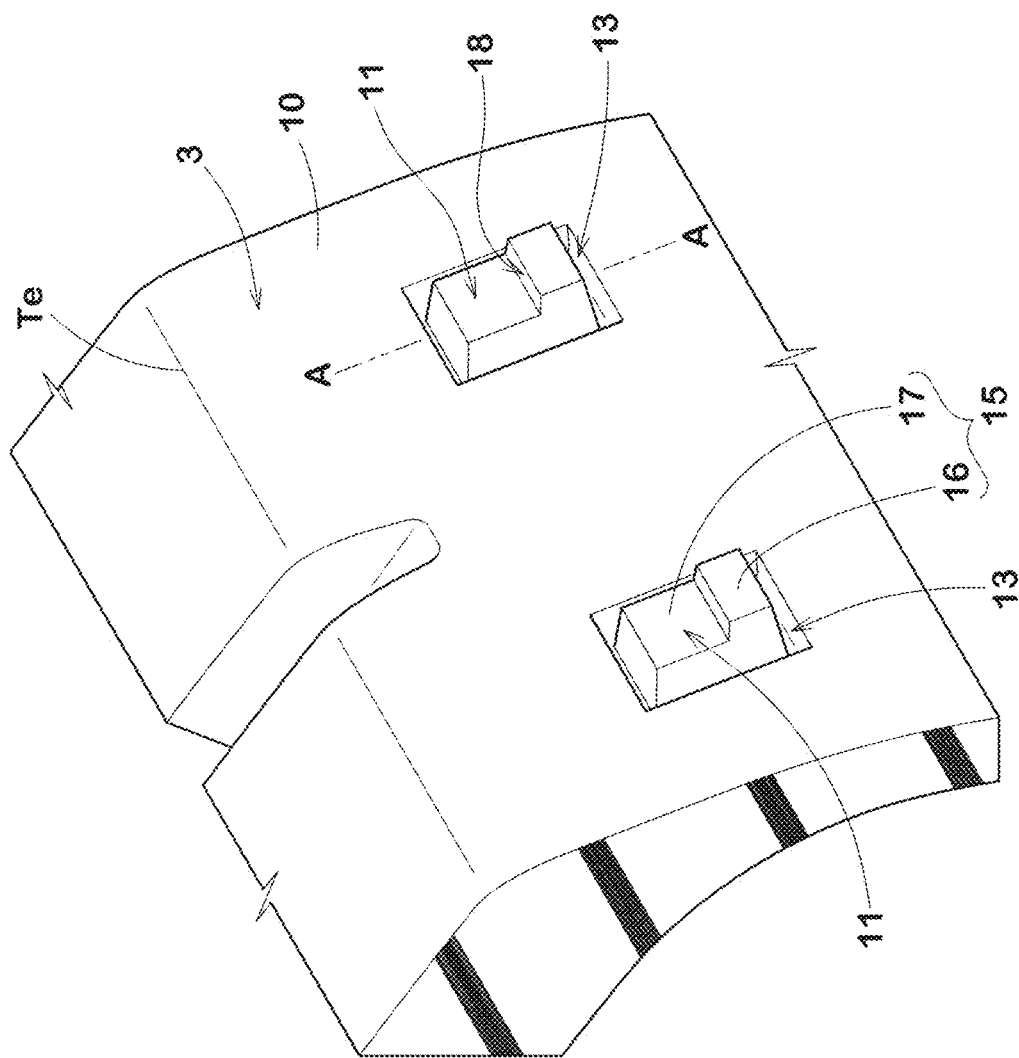
FIG. 2 an enlarged perspective view of a sidewall portion of FIG. 1.

FIG. 2 shows an enlarged perspective view of one of the sidewall portions 3. As shown in FIG. 2, an outer surface in the tire axial direction of at least one of the pair of the sidewall portions 3 includes a base surface 10, at least one first protruding portion 11, and a recessed portion 13. The first protruding portion 11 protrudes more outward in the tire axial direction than the base surface 10. The recessed portion 13 is recessed from the base surface 10 and extending around the first protruding portion 11 such that the first protruding portion 11 is spaced apart from the base surface 10. In the present embodiment, a plurality of the first protruding portions 11 are provided in the tire circumferential direction.

In the present embodiment, the region between each of maximum width positions of the tire 1 and a respective one of tread edges (Te) is included in the outer surface of the sidewall portions 3. The base surface 10 forms the main part of the outer surface of each of the side wall portions 3, and is smoothly connected to the outer surface of the tread portion 2 and the outer surface of a respective one of the bead portions 4. The "tread edges (Te)" are axially outermost ground contacting positions of the tire 1 when the tire 1 in a standard state is in contact with a flat surface with zero camber angle by being loaded with a standard tire load.

The "standard tire load" is, in the case of a pneumatic tire for which various standards are defined, a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. Further, in the case of a tire for which various standards are not defined, the "standard tire load" refers to the load applied to one tire in a standard usage condition of the tire. The term "standard usage condition" refers to a condition in which the tire is mounted on a standard vehicle for the intended use of the tire and the vehicle is stationary on a flat road surface in a roadworthy condition.

Figure 3:
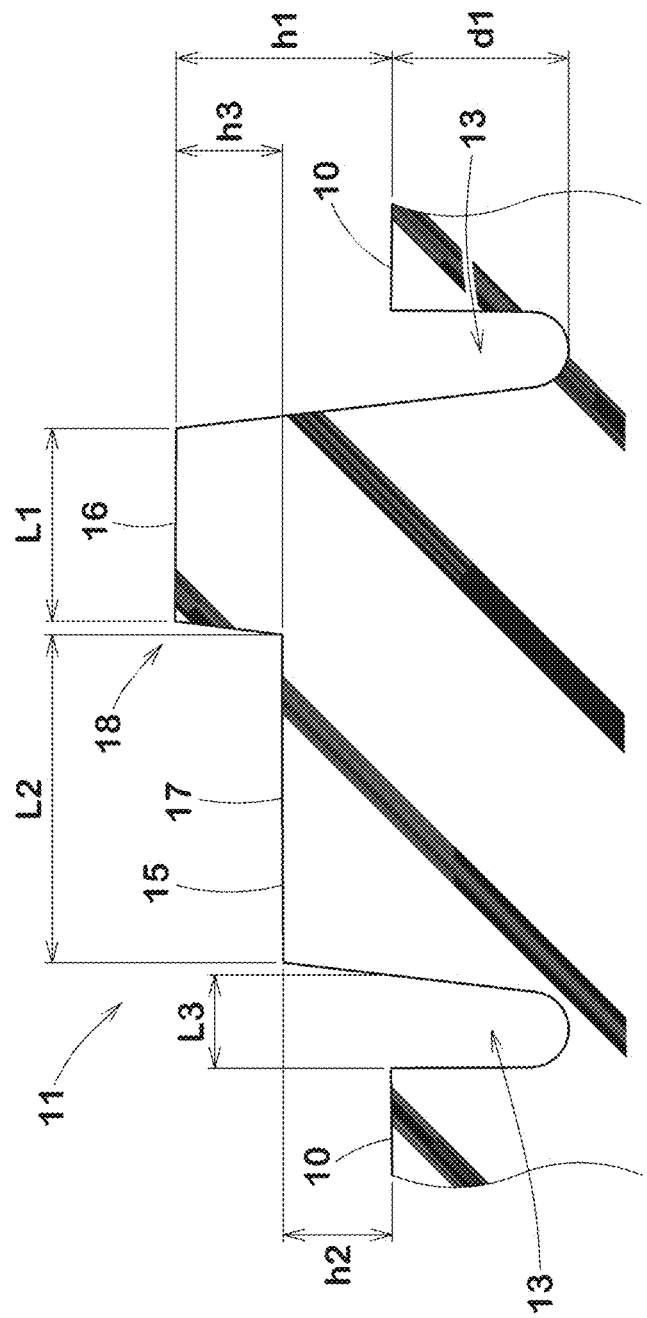
FIG. 3 an end elevational view taken along A-A line of FIG. 2.

FIG. 3 shows an end elevational view taken along A-A line of FIG. 2. As shown in FIG. 3, the first protruding portion 11 includes a first surface 16 having a first protruding amount (h1) with respect to the base surface 10, and a second surface 17 having a second protruding amount (h2) different from the first protruding amount (h1) with respect to the base surface 10, and these surfaces are connected so as to form a step 18. The tire 1 of the present invention can improve traction on a soft road by employing the above configuration. As for the reason for this, the following mechanisms can be inferred.

Generally, on a soft road such as a snowy road and a sandy place, not only the tread portion 2 but also the outer surfaces of the sidewall portions 3 come into contact with the road surface when the tires are running. Therefore, the first protruding portion 11 provides a reaction force in the tire circumferential direction as the tire rotates on a soft road, and increases the traction performance.

In the present invention, due to the recessed portion 13, the first protruding portion 11 is easily deformed from its root portion in the tire circumferential direction. Therefore, the first protruding portion 11 can deform moderately to provide greater traction, even on soft roads.

Further, the presence of the step 18 in the first protruding portion 11 increases the surface area of its top surface 15. Thereby, the contact area between the top surface 15 and the road surface is increased, therefore, the traction performance on a soft road is further improved. It is inferred that the tire 1 of the present invention can improve the traction on a soft road by such a mechanism.

Hereinafter, a more detailed configuration of the present embodiment will be described. The configuration described below represents a specific aspect of the present embodiment. Therefore, it goes without saying that the present invention can exert the above-mentioned effects even if it does not have the configuration described below. In addition, even if any one of the configurations described below is applied alone to the tire of the present invention having the features described above, the improvement in performance can be expected according to each configuration. Further, when some of the configurations described below are applied in combination, a combined improvement in performance can be expected according to each configuration.

As shown in FIG. 1, it is preferred that the first protruding portion 11 is provided at a position where the tire 1 comes into contact with the road surface when running on a soft road. For this reason, the first protruding portion 11 is provided, within the sidewall portions 3, radially outside the maximum width position of the tire 1. In a more preferred embodiment, a distance in the tire radial direction between a respective one of the tread edges (Te) and an outer edge in the tire radial direction of the first protruding portion 11 is less than 50 mm.

As shown in FIG. 2, the top surface 15 of the first protruding portion 11 has a rectangular shape in its plan view, and preferably a radially-elongated rectangular shape, for example. However, said top surface 15 is not limited to such a shape, and can employ various shapes such as polygonal, oval and other shapes.

The step 18 extends in the tire circumferential direction on the top surface 15 of the first protruding portion 11, for example. The step 18 of the present embodiment extends in parallel with the tire circumferential direction and completely crosses the top surface 15.

As shown in FIG. 3, in the first protruding portion 11, the first surface 16 and the second surface 17 are arranged side by side in a tire radial direction. Further, the second protruding amount (h2) is smaller than the first protruding amount (h1), and the second surface 17 is located radially outside the first surface 16. Since the first protruding portion 11 receives a large load on its radially outer region, the load applied to the first protruding portion 11 can be distributed by making the protruding amount of this region relatively small. Therefore, by the above configuration, excessive deformation of the first protruding portion 11 when the first protruding portion 11 comes into contact with a soft road can be suppressed, thereby, the reaction force in the tire circumferential direction can be increased.

A length L1 in the tire radial direction of the first surface 16 is smaller than a length L2 in the tire radial direction of the second surface 17. Specifically, the length L1 of the first surface 16 is 40% or more and 60% or less of the length L2 of the second surface 17. The first surface 16 and the second surface 17 configured as such can improve the traction performance while maintaining durability of the first protruding portion 11.

The first protruding amount (h1) from the base surface 10 is 2 mm or more and 6 mm or less, and preferably 3 mm or more and 5 mm or less, for example. The second protruding amount (h2) from the base surface 10 is 1 mm or more and 5 mm or less, and Preferably 2 mm or more and 4 mm or less, for example. A size (h3) of the step 18 is 1 mm or more and 4 mm or less, and preferably 2 mm or more and 3 mm or less, for example.

It is preferred that the cross-sectional area of the first protruding portion 11 taken along the base surface 10 is larger towards the bottom portion side of the recessed portion 13. Thereby, the rigidity of the root portion of the first protruding portion 11 is increased, therefore, the traction performance is improved. The first protruding portion 11 configured as such can also prevent snow and sand from being retained in the recessed portion 13.

As shown in FIG. 2, it is preferred that the recessed portion 13 is looped around the first protruding portion 11, for example. As a result, a large area of side surfaces facing the tire circumferential direction of the first protruding portion 11 can be ensured, thereby, the traction performance is further improved.

As shown in FIG. 3, an opening width L3 of the recessed portion 13 measured along the base surface 10 is 0.5 mm or more and 3.0 mm or less, for example. A depth (d1) of the recessed portion 13 is 1.0 mm or more and 4.0 mm or less, for example. However, the recessed portion 13 of the present invention is not limited to such an embodiment.

Hereinafter, another embodiment of the present invention will be described. In the drawings showing the another embodiment, the elements already described are denoted by the same reference numerals as those described above, and the above-described configuration can be applied.

Figure 4:
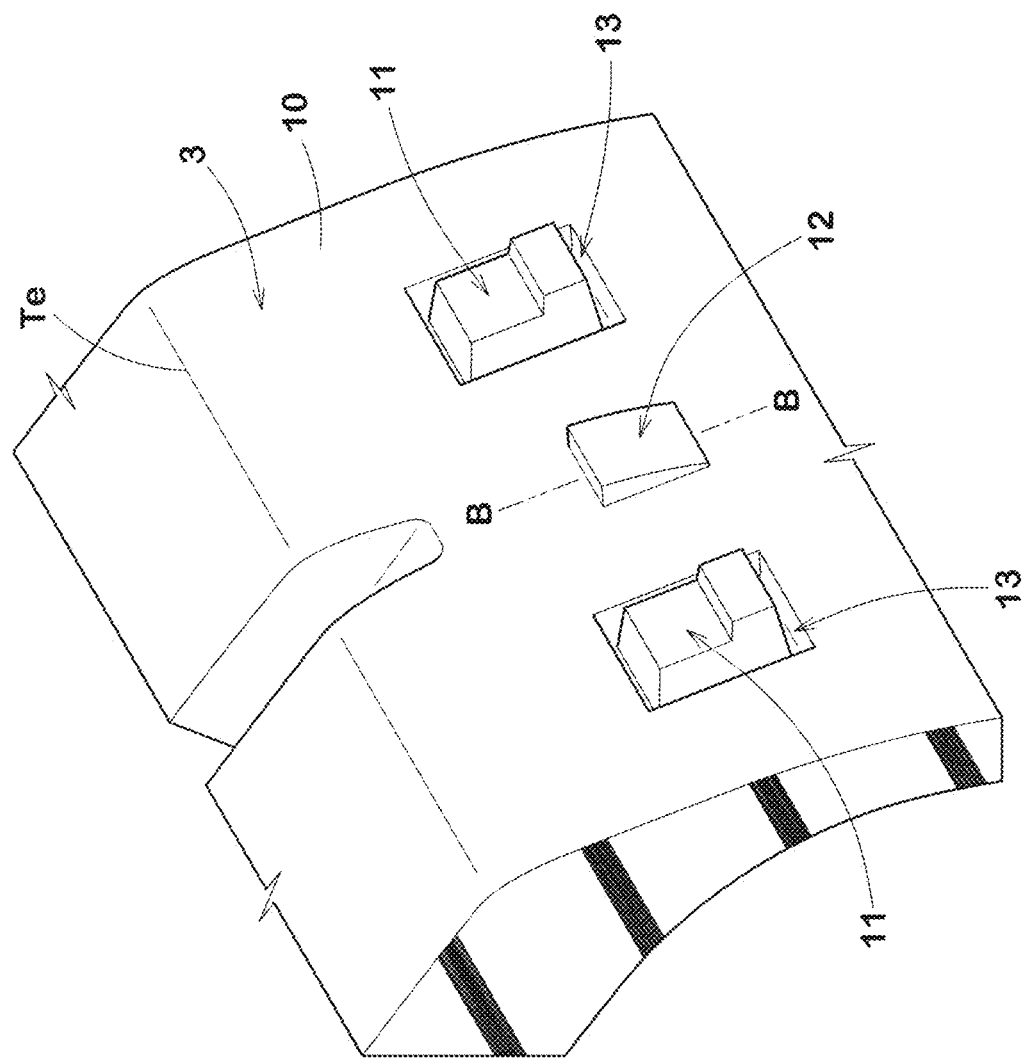
FIG. 4 an enlarged perspective view of the sidewall portion of another embodiment of the present invention.

FIG. 4 shows an enlarged perspective view of one of the sidewall portions 3 of another embodiment of the present invention. At least one of the sidewall portions 3 of this embodiment has a plurality of the first protruding portions 11, and second protruding portions 12, each of which protrudes outward in the tire axial direction than the base surface 10, are each disposed between the first protruding portions 11 adjacent to each other. In this embodiment, it is expected that the traction performance is further improved by the first protruding portions 11 and the second protruding portions 12. Each of the second protruding portions 12 is configured to have a different shape from that of each of the first protruding portions 11. Therefore, the first protruding portions 11 and the second protruding portions 12 are deformed in a different manner, thereby, it is possible that snow and mud are prevented from being adhered to and retained by the sidewall portions 3.

The second protruding portions 12 protrude outward in the tire axial direction directly from the base surface 10, for example. In other words, side surfaces of the second protruding portions 12 are connected to the base surface 10. The second protruding portions 12 configured as such have high rigidity and are useful for improving the traction on a rocky road surface covered with relatively large stones as well as on a soft road surface.

In this embodiment, a maximum length in the tire radial direction of each of the second protruding portions 12 is smaller than a maximum length in the tire radial direction of each of the first protruding portions 11. Further, a maximum length in the tire circumferential direction of each of the second protruding portions 12 is smaller than a maximum length in the tire circumferential direction of each of the first protruding portions 11. Furthermore, a maximum protruding amount of each of the second protruding portions 12 from the base surface 10 is smaller than a maximum protruding amount of each of the first protruding portions 11 from the base surface 10. As a result, it is possible that mud and snow are prevented from being adhered and retained between the first protruding portions 11 and the second protruding portions 12.

Figure 5:
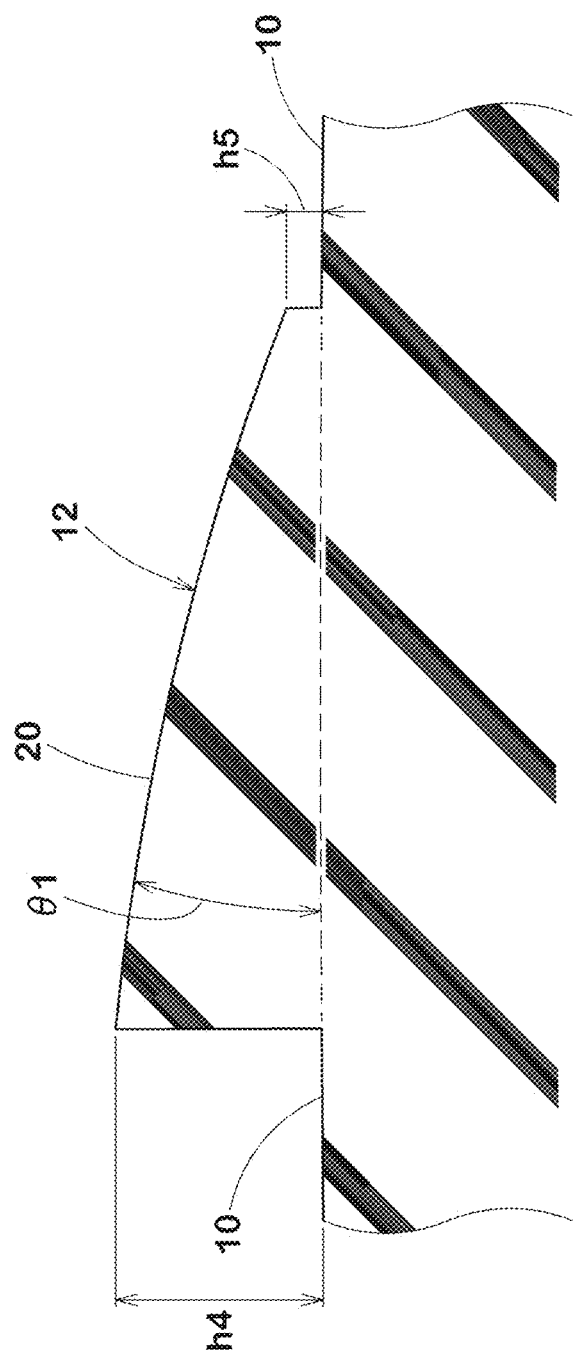
FIG. 5 an end elevational view taken along B-B line of FIG. 4.

FIG. 5 shows an end elevational view taken along B-B line of FIG. 4. As shown in FIG. 5, a top surface 20 of each of the second protruding portions 12 is not provided with a step. Further, the top surface 20 of each of the second protruding portions 12 is formed by a surface curved convexly outward of the tire, for example. Thereby, the durability of the second protruding portions 12 is improved.

Each of the second protruding portions 12 has a protruding amount from the base surface 10 decreasing as it goes radially inward (toward right side in FIG. 5). Thereby, an angle θ1 of the top surface 20 of each of the second protruding portions 12 with respect to the base surface 10 degrees or more and 45 degrees or less, and preferably 15 degrees or more and 25 degrees or less, for example. The second protruding portions 12 configured as such guide snow and sand to the portions of the first protruding portions 11 having large rigidity. Therefore, the second protruding portions 12, in combination with the first protruding portions 11 described above, can further improve the traction performance.

A maximum protruding amount (h4) from the base surface 10 of each of the second protruding portions 12 is smaller than the first protruding amount (h1) (shown in FIG. 3) from the base surface 10 of each of the first protruding portions 11. The maximum amount (h4) of each of the second protruding portions 12 is 30% or more and 60% or less of the first protruding amount (h1) of each of the first protruding portions 11, for example. The second protruding portions 12 configured as such can improve the traction performance while maintaining the durability.

In this embodiment, each of the second protruding portions 12 has the maximum protruding amount (h4) at an outer end portion thereof in the tire radial direction. Further, each of the second protruding portions 12 has a minimum protruding amount (h5) at an inner end portion thereof in the tire radial direction. Said minimum protruding amount (h5) is 10% or more and 30% or less of said maximum protruding amount (h4). Thereby, it is made easier for snow and sand pushed away by the second protruding portions 12 to be guided further to the first surface 16 side of the first protruding portions 11, therefore, the traction performance is further improved.

Figure 6:
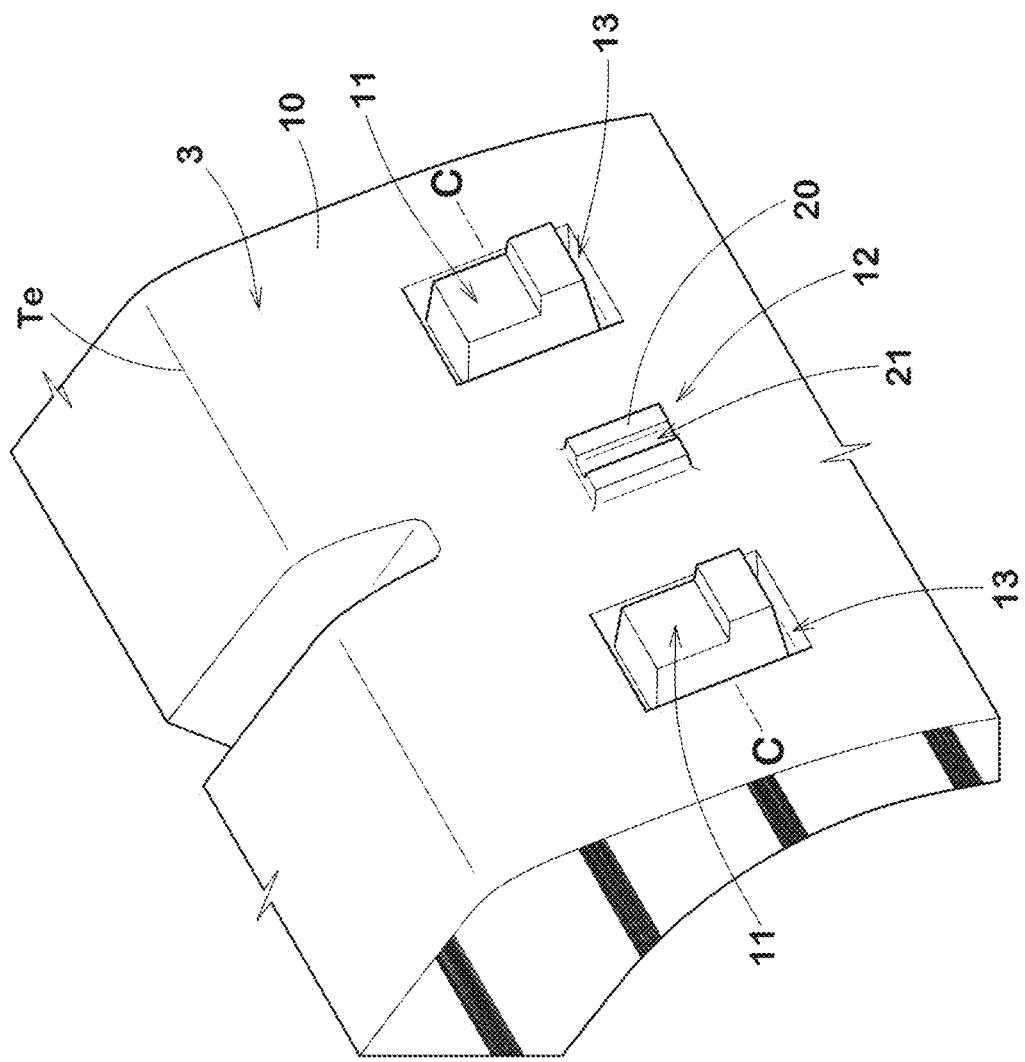
FIG. 6 an enlarged perspective view of the sidewall portion according to yet another embodiment of the present invention.

FIG. 6 shows an enlarged perspective view of one of the sidewall portions 3 provided with the second protruding portions 12 having a shape different from that showed in FIG. 4. As shown in FIG. 6, the top surface 20 of each of the second protruding portions 12 of this embodiment is provided with a concave groove 21. As a result, it is made easier for the second protruding portions 12 to be moderately deformed in the tire circumferential direction, therefore, the traction performance on a soft road is further improved.

In order to ensure the above-mentioned effect, the concave groove 21 extends in the top surface 20 of each of the second protruding portions 12 in the tire radial direction, for example. The concave groove 21 extends parallel to the tire radial direction with a constant width, for example. It is preferred that the concave groove 21 crosses the top surface 20 in the tire radial direction. Further, it is preferred that the concave groove 21 is provided on a center position in the tire circumferential direction of the top surface 20 of each of the second protruding portions 12. The second protruding portions 12 having the concave grooves 21 configured as such, in combination with the first protruding portions 11 described above, can exert excellent traction performance on various road surfaces.

Figure 7:
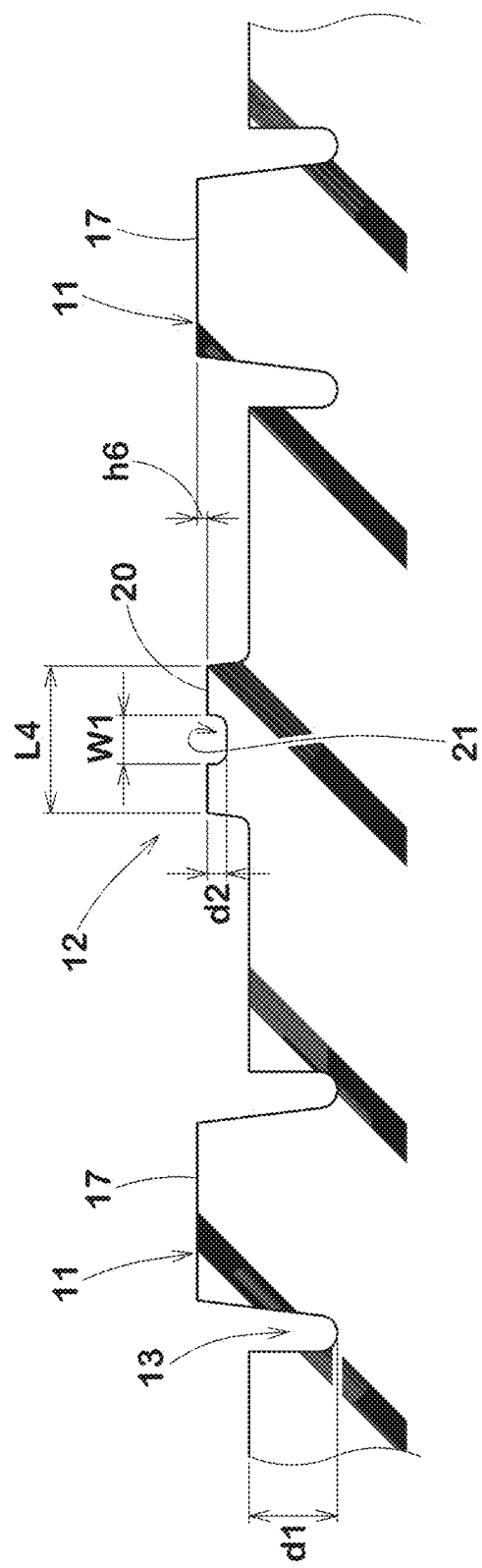
FIG. 7 an end elevational view taken along C-C line of FIG. 6.

FIG. 7 shows an end elevational view taken along C-C line of FIG. 6. As shown in FIG. 7, in this embodiment, the second surfaces 17 of the first protruding portions 11 protrude more than the top surfaces 20 of the second protruding portions 12. A difference (h6) in the protruding amount between the second surface 17 of each of the first protruding portions 11 and the top surface 20 of each of the second protruding portions 12 is preferably 1.0 mm or more, more preferably 1.5 mm or more, and preferably 3.0 mm or less, and more preferably 2.5 mm or less. Thereby, the first protruding portions 11 and the second protruding portions 12 can cooperate to exert excellent traction performance.

A width W1 in the tire circumferential direction of the concave groove 21 is 50% or less, preferably 20% or more and 45% or less of a length L4 in the tire circumferential direction of the top surface 20 of each of the second protruding portions 12, for example. It is preferred that a maximum depth (d2) of the concave groove 21 is smaller than the maximum depth (d1) of each of the recessed portions 13 adjacent to the respective first protruding portion 11. Specifically, the depth (d2) of each of the concave grooves 21 is 0.5 mm or more and 2.0 mm or less, and preferably 1.0 mm or more and 1.5 mm or less. The concave grooves 21 configured as such are helpful for improving the traction performance while maintaining the durability of the second protruding portions 12.

Figure 8:
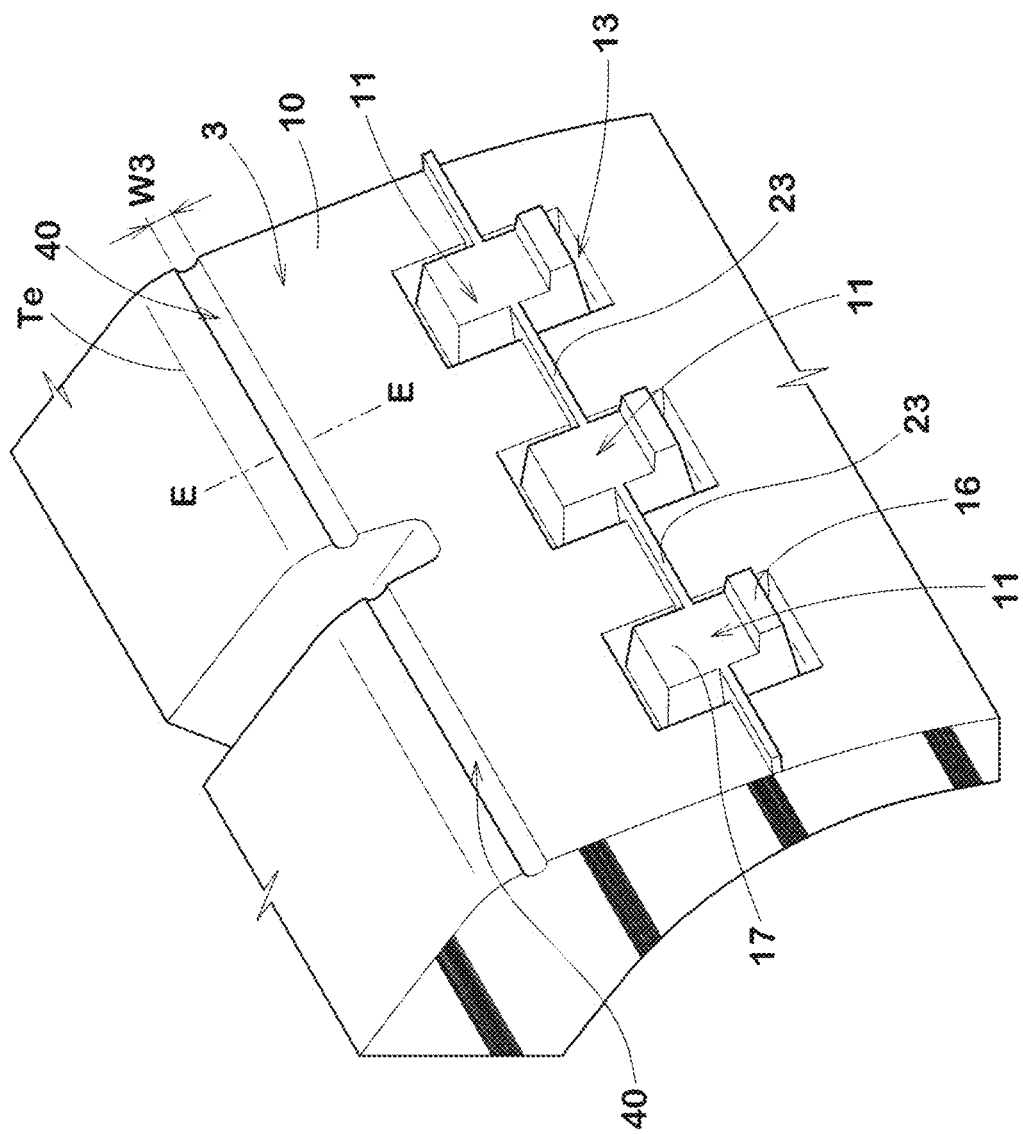
FIG. 8 an enlarged perspective view of the sidewall portion according to further another embodiment of the present invention.

FIG. 8 shows an enlarged perspective view of one of the sidewall portions 3 of further another embodiment of the present invention. As shown in FIG. 8, in this embodiment, between the first protruding portions 11 arranged in tire circumferential direction, ribs 23, each of which extends in the tire circumferential direction so as to connect the first protruding portions 11 adjacent to each other, are provided. The ribs 23 configured as such are deformed in conjunction with the first protruding portions 11, therefore, it is possible that mud and dirt are prevented from being retained around the first protruding portions 11 when running on a soft road.

The top surfaces of the ribs 23 are connected to the second surfaces 17 of the first protruding portions 11 without having steps therebetween, for example. Therefore, a protruding amount of each of the ribs 23 from the base surface 10 is the same as the second protruding amount (h2) of each of the second surfaces 17. However, this embodiment is not limited to such a manner.

The ribs 23 extend parallel to the tire circumferential direction, for example. Further, the ribs 23 are connected to the first protruding portions 11 across the recessed portions 13. Thereby, each of the recessed portions 13 is divided into one side and the other side in the tire radial direction by a respective one of the ribs 23. The ribs 23 configured as such can reliably prevent mud and dirt from being retained in the vicinity of the first protruding portions 11.

A width in a direction orthogonal to a longitudinal direction of each of the ribs 23 is smaller than a length in the tire radial direction of each of the second surfaces 17, for example. Further, the width of each of the ribs 23 is smaller than a length in the tire radial direction of each of the first surfaces 16, for example. Specifically, the width of each of the ribs 23 is 0.5 mm or more and 2.0 mm or less.

Figure 9:
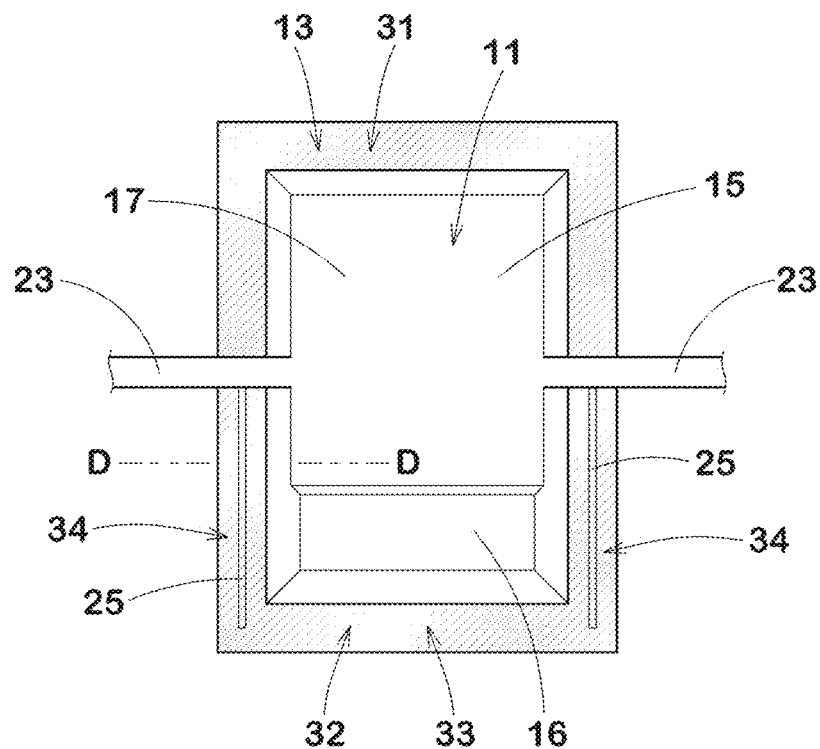
FIG. 9 an enlarged plan view of a top surface of one of first protruding portions and an opening surface of one of recessed portions of FIG. 8.
Figure 10:
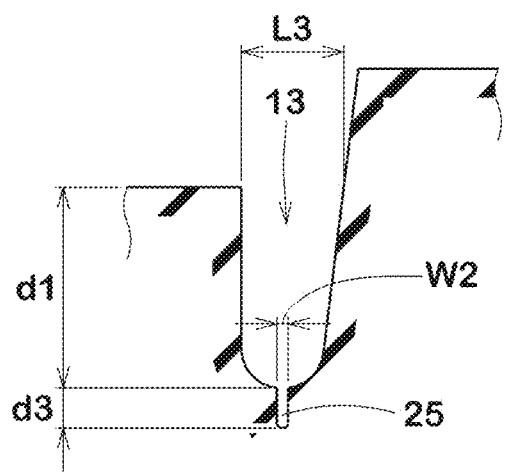
FIG. 10 an end elevational view taken along D-D line of FIG. 9.

FIG. 9 shows an enlarged plan view of the top surface 15 of one of the first protruding portions 11 and an opening surface of the recessed portion 13 around it. It should be noted that the opening surface of the recessed portion 13 is shaded in FIG. 9. FIG. 10 shows an end elevational view taken along D-D line of FIG. 9. As shown in FIG. 9 and FIG. 10, a bottom surface of the recessed portion 13 is provided with a groove portion 25 extending along an opening shape of the recessed portion 13. An opening width W2 of the groove portion 25 is 5% or more and 15% or less, preferably 7% or more and 12% or less of the opening width L3 of the recessed portion 13. A depth (d3) of the groove portion 25 is 5% or more and 20% or less of the depth (d1) of the recessed portion 13 (the depth of the part excluding the groove portion 25). The recessed portion 13 provided with the groove portion 25 configured as such is easy to open and can take in a lot of snow and sand inside.

The recessed portion 13 of this embodiment includes an outer portion 31 positioned radially outside the rib 23 and an inner portion 32 positioned radially inside the rib 23 by being divided by the rib 23, for example. Further, the inner portion 32 includes one circumferential portion 33 extending in the tire circumferential direction and two radial portions 34 connected to both sides of the circumferential portion 33 and extending in the tire radial direction. In this embodiment, the groove portions 25 are provided in the radial portions 34 of the recessed portion 13. On the other hand, the entire outer portion 31 and the circumferential portion 33 of the inner portion 32 are not provided with the groove portion 25. Such an arrangement of the groove portions 25 can exert the above-described effects while maintaining the durability of the first protruding portions 11.

As shown in FIG. 8, the sidewall portions 3 of this embodiment are provided with circumferential grooves 40 arranged radially outside the first protruding portions 11 and extending in the tire circumferential direction. The circumferential grooves 40 configured as such cooperate with the first protruding portions 11 when running on a soft road surface to provide a reaction force in the tire circumferential direction by compressing mud and soil, therefore, the traction performance is improved. In particular, in this embodiment, by the combination of the circumferential grooves 40 and the recessed portions 13 provided with the groove portions 25, excellent traction performance is exerted on a muddy road.

An opening width W3 of each of the circumferential grooves 40 is smaller than the length in the tire radial direction of the second surface 17 of each of the first protruding portions 11, for example. Further, the opening width W3 of each of the circumferential grooves 40 is larger than the width of each of the ribs 23, for example. The opening width W3 of each of the circumferential grooves 40 is 1.5 mm or more and 3.0 mm or less, for example. The depth of each of the circumferential grooves 40 is 0.5 mm or more and 2.5 mm or less, for example.

Figure 11:
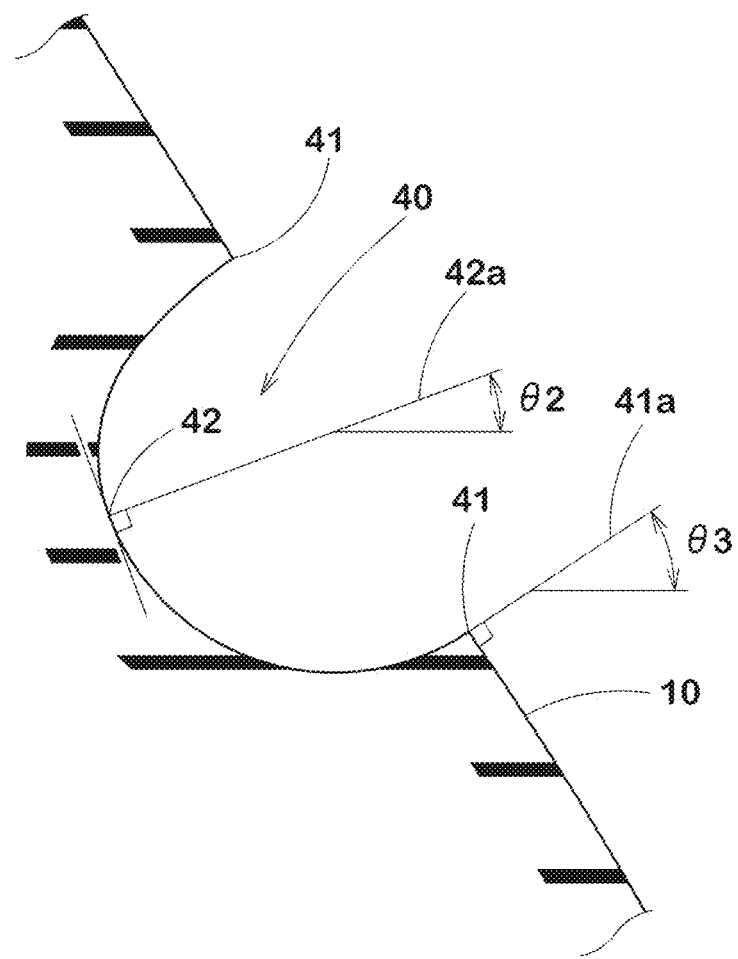
FIG. 11 an end elevational view taken along E-E line of FIG. 8.

FIG. 11 shows an end elevational view taken along E-E line of FIG. 8. As shown in FIG. 11, each of the circumferential grooves 40 has a semi-circular cross-sectional shape, for example. In this embodiment, each of the circumferential grooves 40 includes edges 41, which are connected to the base surface 10, and a bottom 42, which is the deepest point from the base surface 10. In a lateral cross section of each of the circumferential grooves 40, an angle $\theta 2$ with respect to the tire axial direction of a normal line (42a) passing through the bottom 42 is smaller than an angle $\theta 3$ with respect to the tire axial direction of a normal line (41a) passing through one of the edges 41. The angle $\theta 2$ is 5 degrees or more and 30 degrees or less, preferably 10 degrees or more and 25 degrees or less, for example. The circumferential grooves 40 configured as such make it easier to press the mud towards the first protruding portions 11, therefore, the traction performance is further improved.

While detailed description has been made of the tire as an embodiment of the present invention, the present invention can be embodied in various forms without being limited to the illustrated embodiment.

Working Examples (Examples)

Figure 12:
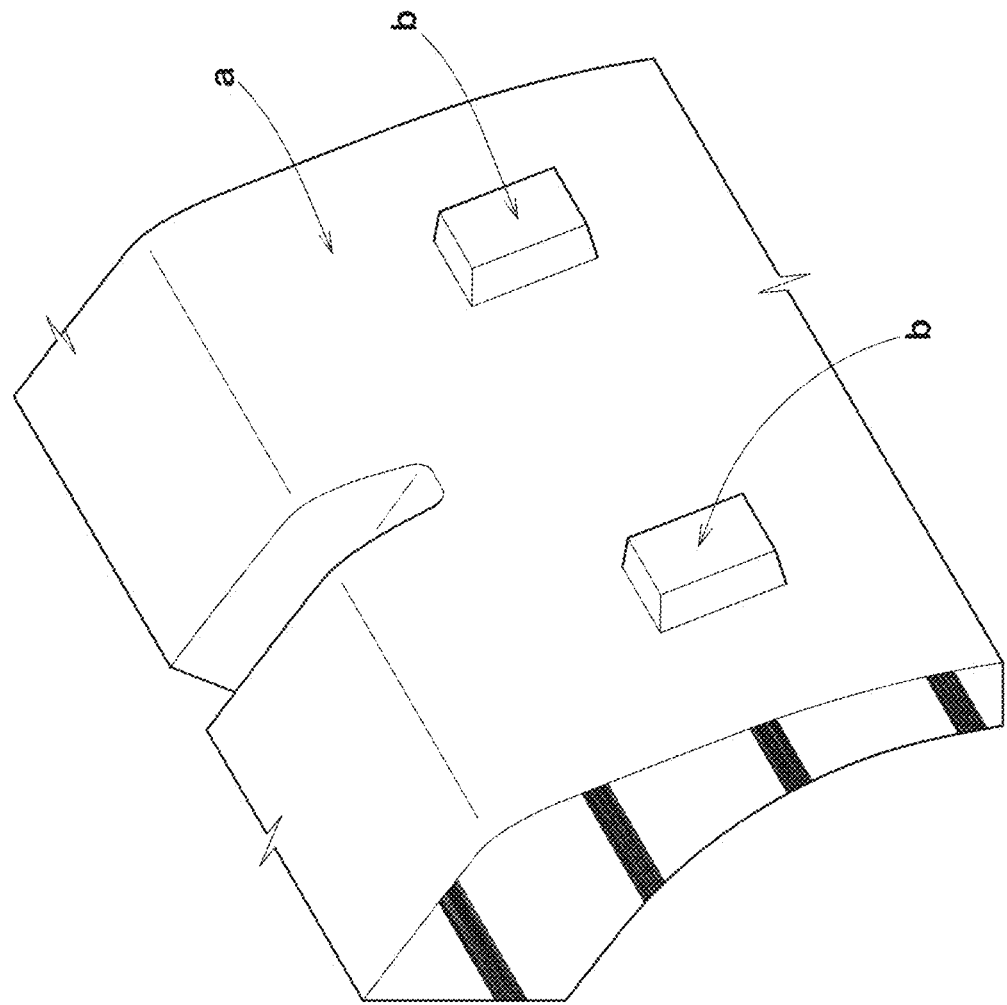
FIG. 12 an enlarged perspective view of one of the sidewall portions of a tire of Reference.

Pneumatic tires of size 35×12.50R20LT having the basic structure shown in FIG. 1 and having the sidewall portions shown in one of FIGS. 2 to 11 were made by way of test. As a Reference, tires having sidewall portions (a) shown in FIG. 12 were made by way of test. As shown in FIG. 12, the sidewall portions (a) of the Reference have a plurality of protruding portions (b) each of which is not surrounded by a recessed portion. Further, each of the protruding portions (b) of the Reference has a flat top surface and does not have a step like the first protruding portion of the present invention. The tires of the Reference have substantially the same configuration as the tires of Examples except for the configuration of the protruding portions. Each of the test tires was tested for the traction performance and the durability of the protruding portions were tested. Common specifications and test methods for each of the test tires are as follows.

Tire rim: 10.0JJ×20
Tire inner pressure: 450 kPa
Test vehicle: displacement of 4700 cc, four-wheel drive
Test tire mounting position: all wheels <Traction Performance>

The average time when the test vehicle was driven two laps on a circuit road consisting of a soft road including a snowy road and a sandy road was measured. The test results are indicated by an index based on an inverse of the average time of the Reference being 100, wherein the larger the numerical value, the shorter the average time is, which shows better traction performance on a soft road.

<Durability of Protruding Portion>

After the test vehicle was driven on a rocky road surface covered with relatively large stones for a certain distance, the number of cracks generated in the first protruding portions was counted. The results are indicated by an index based on an inverse of the number of the Reference being 100. The larger the numerical value, the less likely the cracks occur in the protruding portions, which shows better durability against crack.

It should be noted that, in the following tables, the sum of the index indicating the traction performance and the index indicating the durability of the protruding portion may be treated as a score indicating the overall performance of the tire.

Tires having the protruding portions shown in FIG. 2 and having the varied size (h3) of the steps and the varied depth (d1) of the recessed portions were made by way of test. Further, the above-mentioned tests were carried out on these tires.

Test results are shown in Table 1.

TABLE 1

|  | Ref | Ex.1 | Ex.2 | Ex.3 | Ex.4 | Ex.5 | Ex.6 | Ex.7 | Ex.8 | Ex.9 |
| --- | --- | --- | --- | --- | --- | --- | --- | --- | --- | --- |
| Figure showing Protruding portion | FIG. 12 | FIG. 2 | FIG. 2 | FIG. 2 | FIG. 2 | FIG. 2 | FIG. 2 | FIG. 2 | FIG. 2 | FIG. 2 |
| Size (h3) of Step [mm] | — | 2.5 | 1.0 | 2.0 | 3.0 | 4.0 | 2.5 | 2.5 | 2.5 | 2.5 |
| Depth (d1) of Recessed portion [mm] | — | 2.5 | 2.5 | 2.5 | 2.5 | 2.5 | 1.0 | 2.0 | 3.0 | 4.0 |
| Traction performance [index] | 100 | 120 | 112 | 118 | 122 | 124 | 114 | 113 | 112 | 110 |
| Durability of Protruding portion [index] | 100 | 104 | 104 | 104 | 103 | 101 | 103 | 103 | 104 | 104 |

As shown in Table 1, it was confirmed that the embodiment shown in FIG. 2 exerted excellent traction performance on a soft road. Further, since the protruding portions of the tires in the Examples shown in Table 1 have appropriate flexibility as compared with the protruding portions of the Reference, cracks are less likely to occur, therefore, it was confirmed that excellent durability is exerted.

Tires having the protruding portions shown in FIG. 2 and having varied rates of a cross-sectional area (Sb) and an area (Sa) of each of the first protruding portions were made by way of test. The cross-sectional area (Sb) is a cross-sectional are of each of the first protruding portions taken along the base surface at the bottom of the recessed portion around the respective first protruding portion. The area (Sa) is an area of the top surface of each of the first protruding portions in a plan view. Further, the above-mentioned tests were carried out on these tires.

Test results are shown in Table 2.

TABLE 2

|  | Ref. | Ex.1 | Ex.10 | Ex.11 | Ex.12 | Ex.13 | Ex.14 | Ex.15 |
| --- | --- | --- | --- | --- | --- | --- | --- | --- |
| Figure showing Protruding portion | FIG. 12 | FIG. 2 | FIG. 2 | FIG. 2 | FIG. 2 | FIG. 2 | FIG. 2 | FIG. 2 |
| Area (Sa) of Top surface of First protruding portion/Cross-sectional area (Sb) of First protruding portion taken along Base surface at Bottom of Recessed portion [%] | — | 80 | 65 | 70 | 75 | 85 | 90 | 95 |
| Traction performance [index] | 100 | 120 | 117 | 121 | 122 | 119 | 117 | 116 |
| Durability of Protruding portion [index] | 100 | 104 | 105 | 104 | 104 | 104 | 103 | 103 |

As shown in Table 2, it was confirmed that the area of the top surface of each of the first protruding portions was correlated with the traction performance. Further, it was also confirmed that the Examples shown in Table 2 had excellent durability of the protruding portions.

Tires having the protruding portions shown in FIG. 4 and having the varied angle θ1 of the top surfaces of the second protruding portions were made by way of test. Further, the above-mentioned tests were carried out on these tires.

Test results are shown in Table 3.

TABLE 3

|  | Ref. | Ex.16 | Ex.17 | Ex.18 | Ex.19 | Ex.20 | Ex.21 | Ex.22 | Ex.23 |
| --- | --- | --- | --- | --- | --- | --- | --- | --- | --- |
| Figure showing Protruding portion | FIG. 12 | FIG. 4 | FIG. 4 | FIG. 4 | FIG. 4 | FIG. 4 | FIG. 4 | FIG. 4 | FIG. 4 |
| Angle θ1 of Top surface of Second protruding portion [degree] | — | 25 | 0 | 5 | 10 | 15 | 20 | 30 | 35 |
| Traction performance [index] | 100 | 115 | 106 | 107 | 113 | 114 | 115 | 117 | 118 |
| Durability of Protruding portion [index] | 100 | 106 | 104 | 104 | 104 | 105 | 105 | 106 | 106 |

As shown in Table 3, it was confirmed that the embodiment shown in FIG. 4 exerted excellent traction performance. Further, it was confirmed that the angle θ1 of the top surfaces of the second protruding portions was correlated with the traction performance.

Tires having the protruding portions shown in FIG. 6 and having the varied difference (h6) in the protruding amount between the first protruding portions and the second protruding portions and the varied depth (d2) of the concave grooves were made by way of test. Further, the above-mentioned tests were carried out on these tires.

Test results are shown in Table 4.

TABLE 4

|  | Ref. | Ex.24 | Ex.25 | Ex.26 | Ex.27 | Ex.28 | Ex.29 | Ex.30 | Ex.31 | Ex.32 |
| --- | --- | --- | --- | --- | --- | --- | --- | --- | --- | --- |
| Figure showing Protruding portion | FIG. 12 | FIG. 6 | FIG. 6 | FIG. 6 | FIG. 6 | FIG. 6 | FIG. 6 | FIG. 6 | FIG. 6 | FIG. 6 |
| Difference (h6) in Protruding amount between First protruding portion and Second protruding portion [mm] | — | 2.0 | 1.0 | 1.5 | 2.5 | 3.0 | 2.0 | 2.0 | 2.0 | 2.0 |
| Depth (d2) of Concave groove [mm] | — | 1.2 | 1.2 | 1.2 | 1.7 | 1.7 | 0.5 | 1.0 | 1.5 | 2.0 |
| Traction performance [index] | 100 | 115 | 113 | 114 | 117 | 117 | 110 | 113 | 115 | 117 |
| Durability of Protruding portion [index] | 100 | 106 | 106 | 106 | 105 | 104 | 106 | 106 | 105 | 105 |

As shown in Table 4, it was confirmed that the embodiment shown in FIG. 6 exerted excellent traction performance. Further, it was confirmed that the difference (h6) in the protruding amount and the depth (d2) of the concave grooves were correlated with the traction performance.

Tires having the protruding portions shown in FIG. 8 and having varied size of the groove portions provided within the recessed portions were made by way of test. Further, the above-mentioned tests were carried out on these tires.

Test results are shown in Table 5.

TABLE 5

|  | Ref. | Ex.33 | Ex.34 | Ex.35 | Ex.36 | Ex.37 | Ex.38 |
| --- | --- | --- | --- | --- | --- | --- | --- |
| Figure showing Protruding portion | FIG. 12 | FIG. 8 | FIG. 8 | FIG. 8 | FIG. 8 | FIG. 8 | FIG. 8 |
| Presence or Absence of Groove portion in Recessed portion | — | Presence | Presence | Presence | Presence | Presence | Absence |
| Opening width W2 of Groove portion Opening width L3 of Recessed portion [%] | — | 10.0 | 5.0 | 7.0 | 12.0 | 15.0 | — |
| Traction performance [index] | 100 | 118 | 115 | 117 | 120 | 123 | 112 |
| Durability of Protruding portion [index] | 100 | 97 | 97 | 97 | 96 | 96 | 98 |

As shown in Table 5, it was confirmed that the embodiment shown in FIG. 8 exerted excellent traction performance. Further, it was confirmed that the groove portions provided within the recessed portions were correlated with the traction performance.

Tires having the protruding portions shown in FIG. 8 and having the varied angle θ2 of normal lines each passing through the bottom of a respective one of the circumferential grooves were made by way of test. Further, the above-mentioned tests were carried out on these tires. It should be noted that, in these test tires, the angle θ3 of the normal lines each passing through the edge of a respective one of the circumferential grooves is unified to 35 degrees.

Test results are shown in Table 6.

TABLE 6

|  | Ref. | Ex.33 | Ex.39 | Ex.40 | Ex.41 | Ex.42 | Ex.43 | Ex.44 |
| --- | --- | --- | --- | --- | --- | --- | --- | --- |
| Figure showing Protruding portion | FIG. 12 | FIG. 8 | FIG. 8 | FIG. 8 | FIG. 8 | FIG. 8 | FIG. 8 | FIG. 8 |
| Presence or Absence of Circumferential groove | — | Presence | Presence | Presence | Presence | Presence | Presence | Absence |
| Angle θ2 of Normal line passing through Bottom of Circumferential groove [degree] | — | 15 | 5 | 10 | 20 | 25 | 30 | — |
| Traction performance [index] | 100 | 118 | 116 | 118 | 117 | 116 | 114 | 106 |
| Durability of Protruding portion [index] | 100 | 97 | 97 | 97 | 97 | 97 | 97 | 97 |

As shown in Table 5, it was confirmed that the embodiment shown in FIG. 8 exerted excellent traction performance. Further, it was confirmed that the angle θ2 was correlated with the traction performance.

DESCRIPTION OF REFERENCE SIGNS 3 sidewall portions
10 base surface
11 first protruding portion
13 recessed portion
16 first surface
17 second surface
h1 first protruding amount
h2 second protruding amount

The invention claimed is:

1. A pneumatic tire comprising:
a pair of sidewall portions; wherein
an outer surface in a tire axial direction of at least one of the sidewall portions includes
a base surface,
at least one first protruding portion protruding more outward in the tire axial direction than the base surface, and
a recessed portion extending on the base surface and completely surrounding the first protruding portion such that the first protruding portion is spaced apart from the base surface,
the first protruding portion includes a first surface having a first protruding amount with respect to the base surface, and a second surface having a second protruding amount different from the first protruding amount with respect to the base surface, and
the first surface and the second surface are connected so as to form a step.

2. The pneumatic tire according to claim 1, wherein, in the first protruding portion, the first surface and the second surface are arranged in a tire radial direction.

3. The pneumatic tire according to claim 2, wherein
the second protruding amount is smaller than the first protruding amount, and
the second surface is located radially outside the first surface.

4. The pneumatic tire according to claim 1, wherein a cross-sectional area of the first protruding portion taken along the base surface is increased as it goes towards a bottom portion of the recessed portion.

5. The pneumatic tire according to claim 1, wherein
the at least one first protruding portion is a plurality of the first protruding portions,
the at least one of the sidewall portions is provided with the plurality of the first protruding portions, and
a second protruding portion, which protrudes more outward in the tire axial direction than the base surface, is arranged between the first protruding portions adjacent to each other.

6. The pneumatic tire according to claim 5, wherein the second protruding portion protrudes outward in the tire axial direction directly from the base surface.

7. The pneumatic tire according to claim 5, wherein the second protruding portion has a protruding amount from the base surface decreasing as it goes inward in a tire radial direction.

8. The pneumatic tire according to claim 5, wherein a maximum protruding amount of the second protruding portion from the base surface is smaller than a maximum protruding amount of each of the first protruding portions from the base surface.

9. The pneumatic tire according to claim 5, wherein a maximum length in a tire radial direction of the second protruding portion is smaller than a maximum length in the tire radial direction of each of the first protruding portions.

10. The pneumatic tire according to claim 5, wherein a maximum length in a tire circumferential direction of the second protruding portion is smaller than a maximum length in the tire circumferential direction of each of the first protruding portions.

11. The pneumatic tire according to claim 5, wherein
the second protruding portion includes a top surface facing outward in the tire axial direction, and
the top surface is provided with a concave groove.

12. The pneumatic tire according to claim 11, wherein the concave groove extends on the top surface of the second protruding portion in a tire radial direction.

13. The pneumatic tire according to claim 1, wherein a bottom surface of the recessed portion is provided with a groove portion extending along an opening shape of the recessed portion.

14. The pneumatic tire according to claim 1, wherein the at least one of the sidewall portions is provided with a circumferential groove arranged outside the first protruding portion in a tire radial direction and extending in a tire circumferential direction.

15. The pneumatic tire according to claim 14, wherein
the circumferential groove includes an edge connected to the base surface, and a bottom, which is a deepest point from the base surface,
in a lateral cross section of the circumferential groove, an angle with respect to the tire axial direction of a normal line passing through the bottom is smaller than an angle with respect to the tire axial direction of a normal line passing through the edge.

16. The pneumatic tire according to claim 1, wherein a length in a tire radial direction of the first surface is from 40% to 60% of a length in the tire radial direction of the second surface.

17. The pneumatic tire according to claim 14, wherein an opening width of the circumferential groove is smaller than a length in the tire radial direction of the second surface.

18. The pneumatic tire according to claim 17, wherein the opening width is from 1.5 mm to 3.0 mm.

19. The pneumatic tire according to claim 18, wherein a depth of the circumferential groove is from 0.5 mm to 2.5 mm.

\* \* \* \* \*